(12) United States Patent
Tsukamoto

(10) Patent No.: US 12,172,731 B2
(45) Date of Patent: Dec. 24, 2024

(54) ELECTRIC POWER ASSIST DEVICE FOR BICYCLES AND BICYCLE

(71) Applicant: HONDA MOTOR CO., LTD., Tokyo (JP)

(72) Inventor: Kenji Tsukamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 590 days.

(21) Appl. No.: 17/605,427

(22) PCT Filed: Feb. 18, 2020

(86) PCT No.: PCT/JP2020/006241
§ 371 (c)(1),
(2) Date: Oct. 21, 2021

(87) PCT Pub. No.: WO2020/217664
PCT Pub. Date: Oct. 29, 2020

(65) Prior Publication Data
US 2022/0212750 A1  Jul. 7, 2022

(30) Foreign Application Priority Data

Apr. 25, 2019  (JP) ................................. 2019-084258

(51) Int. Cl.
*B62M 6/50* (2010.01)
*B62J 45/20* (2020.01)
(Continued)

(52) U.S. Cl.
CPC ................ *B62M 6/50* (2013.01); *B62J 45/20* (2020.02); *B62J 45/415* (2020.02); *B62M 6/55* (2013.01); *B62M 6/90* (2013.01)

(58) Field of Classification Search
CPC .................................. B62M 6/55; B62M 6/50
See application file for complete search history.

(56) References Cited

U.S. PATENT DOCUMENTS 5,806,621 A    9/1998  Soda et al.
5,878,831 A    3/1999  Saito et al.
(Continued)

FOREIGN PATENT DOCUMENTS

CN    102849168 A    1/2013
CN    205769945 U    12/2016
(Continued)

OTHER PUBLICATIONS

Extended European Search Report for Patent Application EP 20796177.2 dated May 18, 2022; 11 pp.

(Continued)

*Primary Examiner* — Tony H Winner
*Assistant Examiner* — Hosam Shabara
(74) *Attorney, Agent, or Firm* — Armstrong Teasdale LLP

(57) ABSTRACT

An electric power assist device includes a housing for attaching to a frame structure of a bicycle; an electric motor provided in the housing; a rotating member rotatably supported by the housing, rotationally driven by the electric motor, and connected to a crankshaft/crankarm of the bicycle in a torque transmitting relationship; a rotational angle sensor provided in the housing and configured to detect a rotational angle of the electric motor or the rotating member; and a control unit for controlling operation of the electric motor based on the rotational angle detected by the rotational angle sensor, wherein the electric power assist device has a tilt angle detector for detecting a tilt angle with respect to a direction of gravity, the control unit having a calibrator for determining an absolute angle of the rotational angle detected by the rotational angle sensor based on an output signal from the tilt angle detector.

15 Claims, 15 Drawing Sheets

(51) Int. Cl.
*B62J 45/415* (2020.01)
*B62M 6/55* (2010.01)
*B62M 6/90* (2010.01)

(56) References Cited

U.S. PATENT DOCUMENTS

| | | | |
|---|---|---|---|
| 2013/0179016 A1 | | 7/2013 | Gale |
| 2017/0021896 A1* | | 1/2017 | Tsuchizawa ............. B62M 6/45 |
| 2017/0088157 A1 | | 3/2017 | Young et al. |
| 2017/0297651 A1 | | 10/2017 | Tsuchizawa et al. |
| 2018/0056812 A1 | | 3/2018 | Hamann |
| 2018/0257740 A1* | | 9/2018 | Kikkawa ............... B62B 5/0073 |
| 2022/0009588 A1* | | 1/2022 | Kawakami ............. B62J 45/413 |

FOREIGN PATENT DOCUMENTS

| | | | | |
|---|---|---|---|---|
| DE | 102009000919 A1 | 8/2010 | | |
| JP | H04321482 A | 11/1992 | | |
| JP | H0858667 A | 3/1996 | | |
| JP | H0986476 A | 3/1997 | | |
| JP | 2000053069 A | 2/2000 | | |
| JP | 2001063678 A | * 3/2001 | ............ | B60L 11/007 |
| JP | 2008260400 A | 10/2008 | | |
| JP | 2013256198 A | 12/2013 | | |
| JP | 2015027843 A | 2/2015 | | |
| JP | 2017190100 A | 10/2017 | | |
| TW | 201801985 A | 1/2018 | | |

OTHER PUBLICATIONS

Schnee Jan et al., "Auto-Calibration of Bias Compensated 2D-Mounting Orientation of an IMU on an Electric Bicycle Using Bike-Specific Motions"; 2018 IEEE Sensors, IEEE; Oct. 28, 2018; pp. 1-4.

International Search Report for Patent Application PCT/JP2020/006241 mailed Apr. 21, 2020; 6 pp.

* cited by examiner

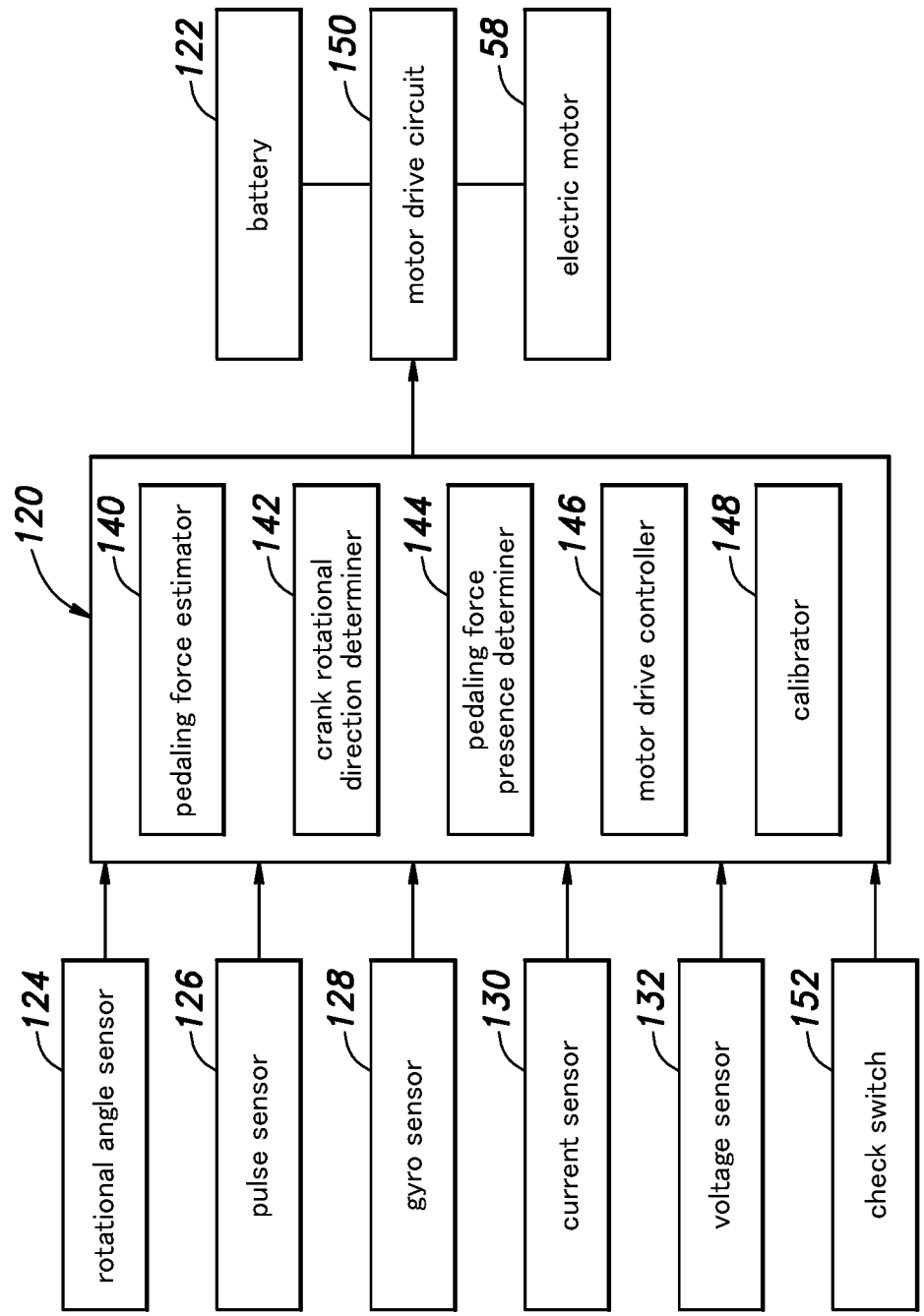

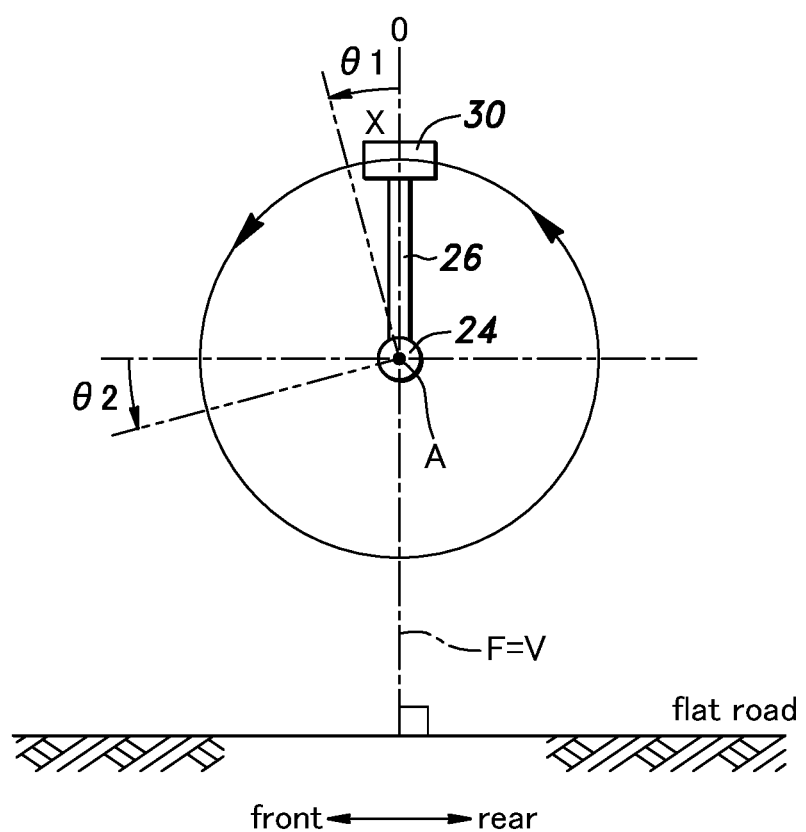

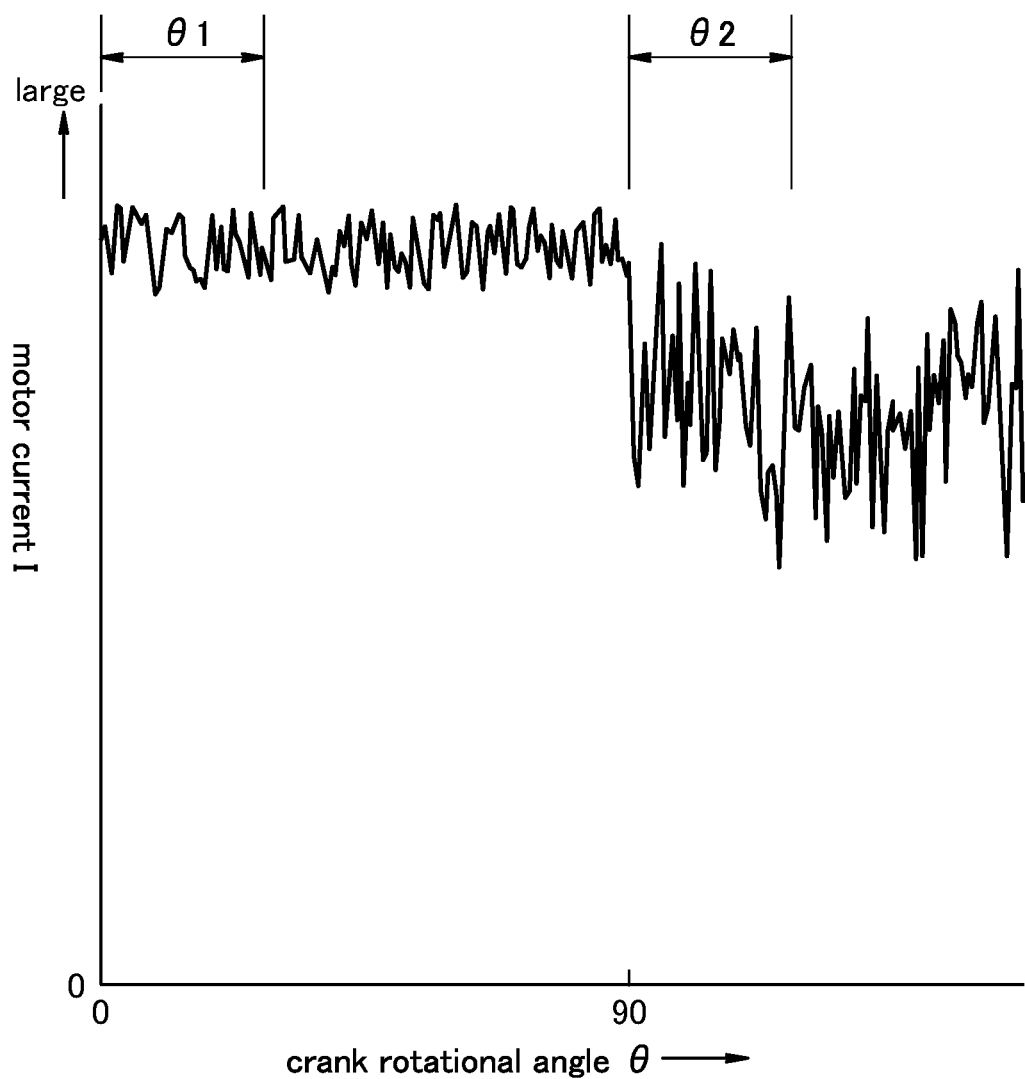

ELECTRIC POWER ASSIST DEVICE FOR BICYCLES AND BICYCLE

CROSS-REFERENCE TO RELATED APPLICATIONS

This application is a U.S. National Phase Application of PCT/JP2020/006241 filed Feb. 18, 2020, which claims the benefit of Japanese Patent Application No. 2019-084258 filed Apr. 25, 2019. The content of these applications is hereby expressly incorporated by reference in their entirety.

TECHNICAL FIELD

The present invention relates to an electric power assist device for bicycles, and a bicycle. In particular, the present invention relates to an electric power assist device for bicycles capable of calibrating a rotational angle sensor for detecting crank rotational angles used for power assist control, and a bicycle fitted with the electric power assist device.

BACKGROUND ART

Known power assisted bicycles include those configured to detect a pedaling force with a torque sensor, and control an electric motor for assisting the rider's pedaling based on the detected pedaling force (See Patent Documents 1 and 2).

PRIOR ART DOCUMENT(S)

Patent Document(s)

Patent Document 1: JP2000-053069A
Patent Document 2: JP2008-260400A

SUMMARY OF THE INVENTION

Task to be Accomplished by the Invention

Known technologies for power assisted bicycles include using an electric power assist device which can be attached to a frame structure of a bicycle and perform power assist control without using a torque sensor, where the electric power assist device includes: an electric motor connected to a crankshaft or crankarm in a torque transmitting relationship; a rotational angle sensor for detecting a crank rotational angle of the crankshaft; and a control unit for controlling operation of the electric motor, and is configured to determine a drive torque of the electric motor based on a difference or a ratio between motor currents, angular velocities, or angular acceleration values measured at a first crank rotational angle and a second crank rotational angle in each cycle of the rotation of the crankshaft.

Such an electric power assist device for power assisted bicycles needs to detect the absolute angle of a crank rotational angle in order to determine a first crank rotational angle and a second crank rotational angle. Thus, when the electric power assist device can be mounted on bicycles at different angles, the variation of the angle at which the electric power assist device is mounted on a bicycle produces errors in the crank rotational angles (absolute angles) detected by the rotational angle sensor provided therein, resulting in the inability to achieve a proper power assist control.

The present invention has been made in view of the problem of the prior art, and a primary object of the present invention is to provide an electric power assist device which can achieve proper power assist control regardless of the angle at which the electric power assist device mounted on a bicycle.

Means to Accomplish the Task

One aspect of the present invention provides an electric power assist device which can achieve proper power assist control regardless of the angle at which the electric power assist device mounted on a bicycle. An electric power assist device for bicycles of the present invention comprises: a housing (52) which can be attached to a frame structure (18) of a bicycle (10); an electric motor (58) provided in the housing; a rotating member (64, 72) rotatably supported by the housing, rotationally driven by the electric motor, and connected to a crankshaft (24) or crankarm (26) of the bicycle in a torque transmitting relationship; a rotational angle sensor (124) provided in the housing and configured to detect a rotational angle of the electric motor or the rotating member; and a control unit (120) for controlling operation of the electric motor (58) based on the rotational angle detected by the rotational angle sensor, wherein the electric power assist device further comprises a tilt angle detector (128) for detecting a tilt angle with respect to a direction of gravity, and wherein the control unit comprises a calibrator (148) for determining an absolute angle of the rotational angle detected by the rotational angle sensor based on an output signal from the tilt angle detector.

This configuration enables proper power assist control regardless of the angle at which the electric power assist device mounted on a bicycle.

In this electric power assist device, preferably, the tilt angle detector includes a gyro sensor (128).

According to this configuration, the tilt angle detector can accurately detect the tilt angle with respect to the direction of gravity without being bulky.

In this electric power assist device, preferably, the housing and the rotating member are provided with respective marks (154, 156) which are externally visible, wherein alignment of the marks indicates that the rotating member is rotated to a predetermined rotational position with respect to the housing, and wherein the calibrator determines the absolute angle of the rotational angle sensor when the marks are aligned.

In this configuration, the calibration can be easily performed by aligning the marks to thereby adjust the rotational position of the rotating member.

In this electric power assist device, preferably, the calibrator determines the absolute angle of the rotational angle sensor when the rotating member is maintained at the predetermined rotational position for a predetermined period of time.

In this configuration, the calibration can be properly performed by aligning the marks to thereby adjust the rotational position of the rotating member.

In this electric power assist device, preferably, the electric power assist device further comprises a check switch (152) which can be toggled by a user's manual operation, and wherein the calibrator determines the absolute angle of the rotational angle sensor when the check switch is toggled.

In this configuration, the calibration can be properly performed by aligning the marks to thereby adjust the rotational position of the rotating member.

In this electric power assist device, preferably, the electric power assist device further comprises a position sensor (158, 160) for detecting that the rotating member is positioned at a predetermined rotational position, wherein the calibrator determines the absolute angle of the rotational angle sensor when the position sensor detects that the rotating member is positioned at the predetermined rotational position.

In this configuration, the adjustment of the rotational position of the rotating member can be automatically confirmed, which enables the calibration to be properly performed.

In this electric power assist device, preferably, the predetermined rotational position of the rotating member is set as any rotational position within a predetermined rotational position range of the rotating member.

In this configuration, a user can set the absolute angles of the first and second crank rotational angles as desired, which enables the response time of power assist control to be customized for the user.

In this electric power assist device, preferably, the control unit allows power assist control to be started when the rotating member is sequentially positioned at a plurality of predetermined rotational positions in a predetermined sequence.

In this configuration, the electric power assist device serves as a dial-lock-type lock mechanism, providing an anti-theft feature.

In this electric power assist device, preferably, the control unit determines a drive torque of the electric motor based on a difference or a ratio between motor currents, angular velocities, or angular acceleration values measured at a first crank rotational angle and a second crank rotational angle in each cycle of the rotation of the crankshaft.

In this configuration, a pedaling force put on the pedals of the bicycle (10) can be estimated based on a difference or a ratio between motor currents, angular velocities, or angular acceleration values measured at a first crank rotational angle and a second crank rotational angle, and power assist control can be performed based on the estimated pedaling force.

In this electric power assist device, preferably, a rotational phase difference between the first crank rotational angle and the second crank rotational angle is 90 degrees.

This configuration enables more accurate estimation of a pedaling force based on a difference or a ratio between motor currents, angular velocities, or angular acceleration values measured at a first crank rotational angle and a second crank rotational angle.

In this electric power assist device, preferably, when the bicycle is travelling on a uphill road which slopes upward at an upward-inclined angle, the control unit corrects the first and second crank rotational angles so as to advance the angles by an amount corresponding to the upward-inclined angle, and wherein, when the bicycle is travelling on a downhill road which slopes downward at a downward-inclined angle, the control unit corrects the first and second crank rotational angles so as to delay the angles by an amount corresponding to the downward-inclined angle.

This configuration enables accurate estimation of a pedaling force even when the bicycle is traveling on a slope road.

In this electric power assist device, preferably, the control unit determines whether the crankshaft rotates in a forward direction or in a reverse direction based on crank rotational angles detected by the rotational angle sensor, and wherein, when determining that the crankshaft rotates in the reverse direction, the control unit causes the electric motor to stop operating.

This configuration prevents the electric power assist device from performing unnecessary power assist when the crankshaft rotates in the reverse direction.

In this electric power assist device, preferably, the control unit corrects a drive torque of the electric motor based on the tilt angle with respect to the direction of gravity detected by the tilt angle detector.

This configuration enables proper power assist control when the bicycle is traveling on a slope road.

In this electric power assist device, preferably, the electric power assist device further comprises: a battery (122) which serves as a power source for the electric motor; and a voltage sensor (132) for detecting a voltage of the battery, wherein the control unit reduces a rotational output of the electric motor in response to a voltage drop detected by the voltage sensor.

This configuration prevents over-discharging of the battery.

Another aspect of the present invention provides a bicycle fitted with the above-described electric power assist device.

This configuration enables proper power assist control regardless of the angle at which the electric power assist device mounted on the bicycle.

Effect of the Invention

In an electric power assist device and a bicycle according to the present invention, proper power assist control can be performed regardless of the angle at which the electric power assist device mounted on the bicycle.

BRIEF DESCRIPTION OF THE DRAWINGS

FIG. 4 is a block diagram of a power assist control system for the electric power assist device and a bicycle fitted with the electric power assist device of the first embodiment;

FIG. 5 is an explanatory diagram showing a crank rotational angle when the bicycle is traveling on a flat road;

FIG. 7 is a graph showing the relationship between the crank rotational angle and the motor current in the bicycle;

DESCRIPTION OF THE PREFERRED EMBODIMENT(S)

An electric power assist device and a bicycle according to a first embodiment of the present invention will be described with reference to FIGS. 1 to 9.

Figure 1:
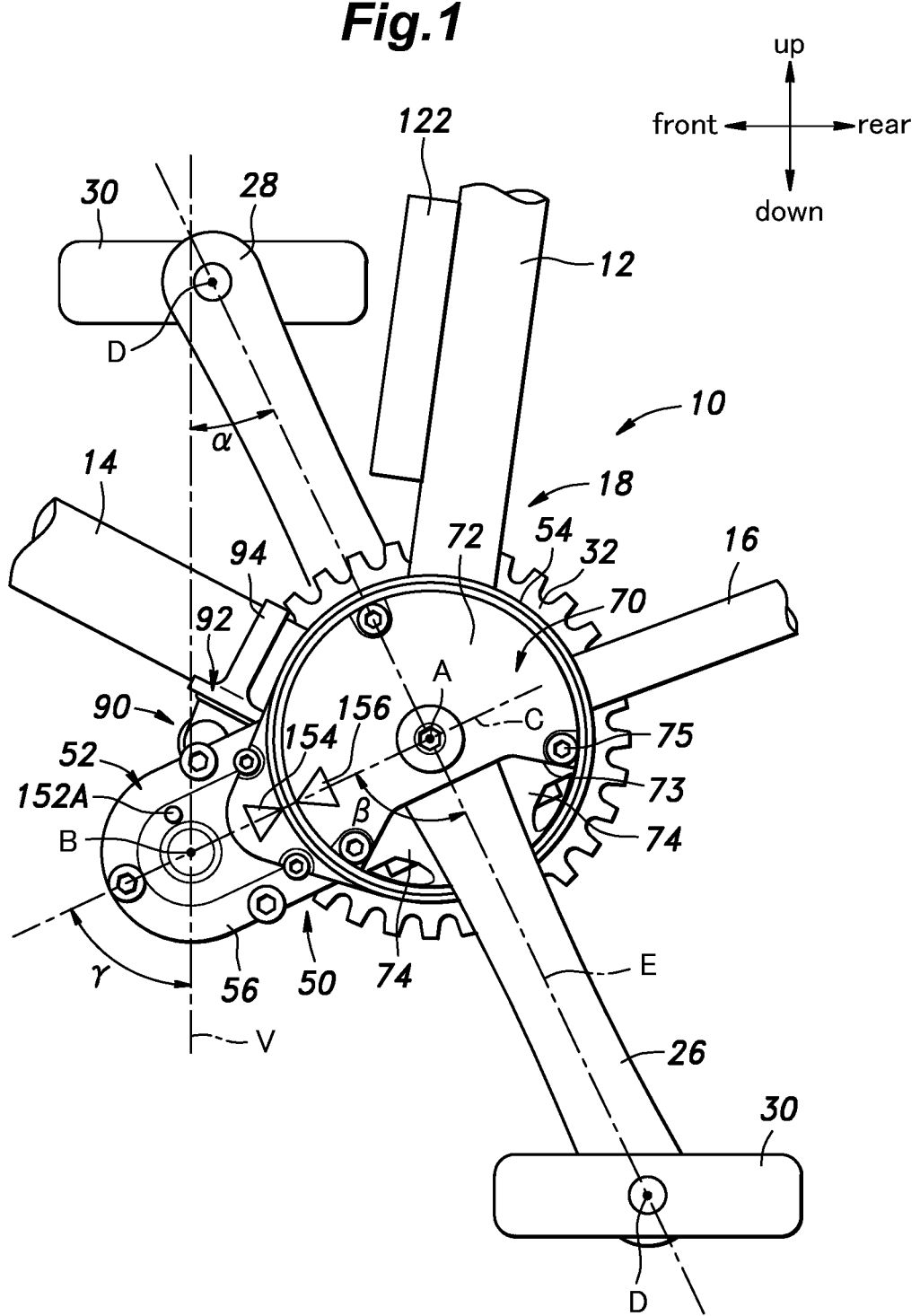
FIG. 1 is a side view of an electric power assist device according to a first embodiment of the present invention and a bicycle fitted with the electric power assist device.
Figure 2:
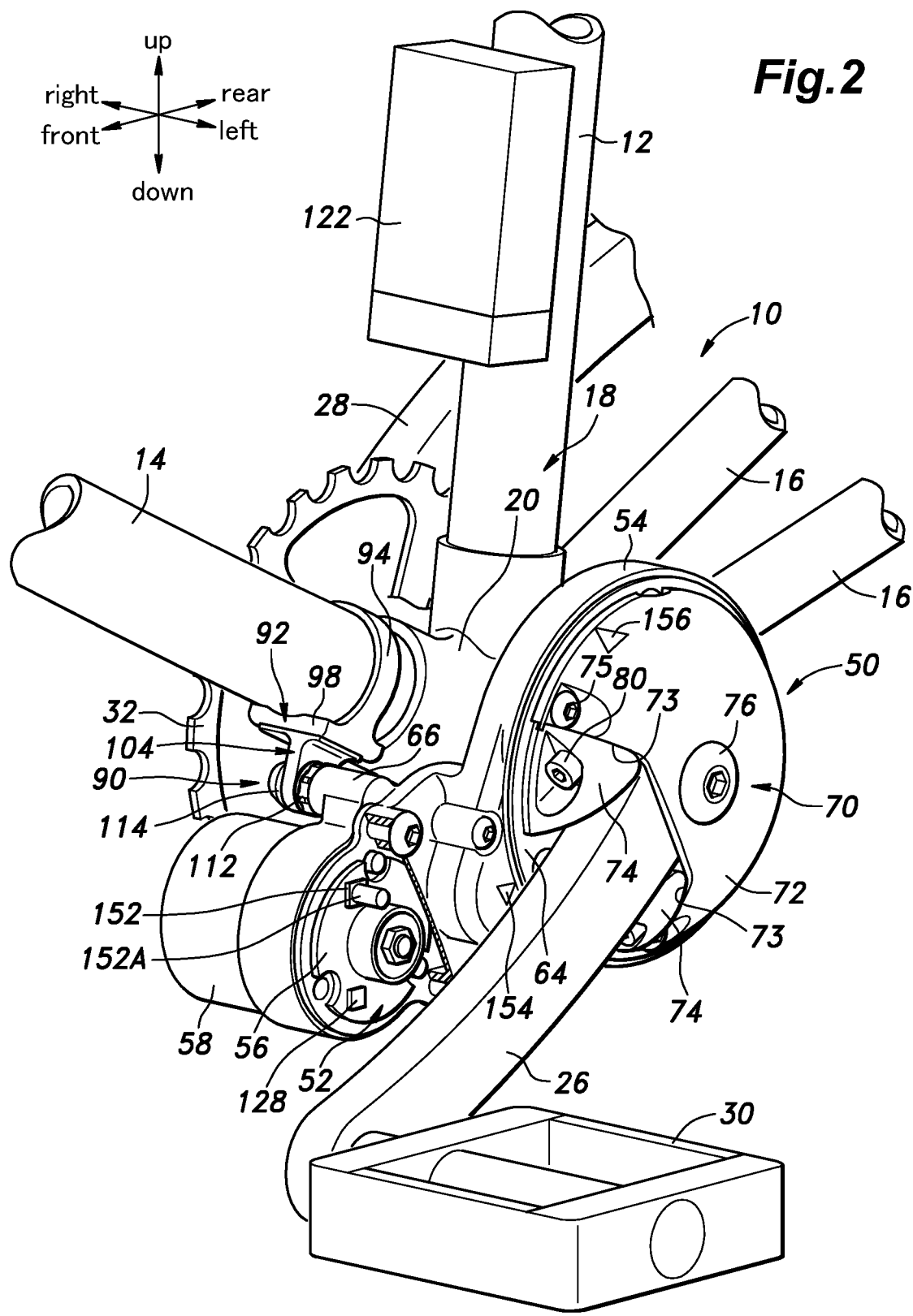
FIG. 2 is a fragmentary perspective view of the electric power assist device and the bicycle of the first embodiment.
Figure 3:
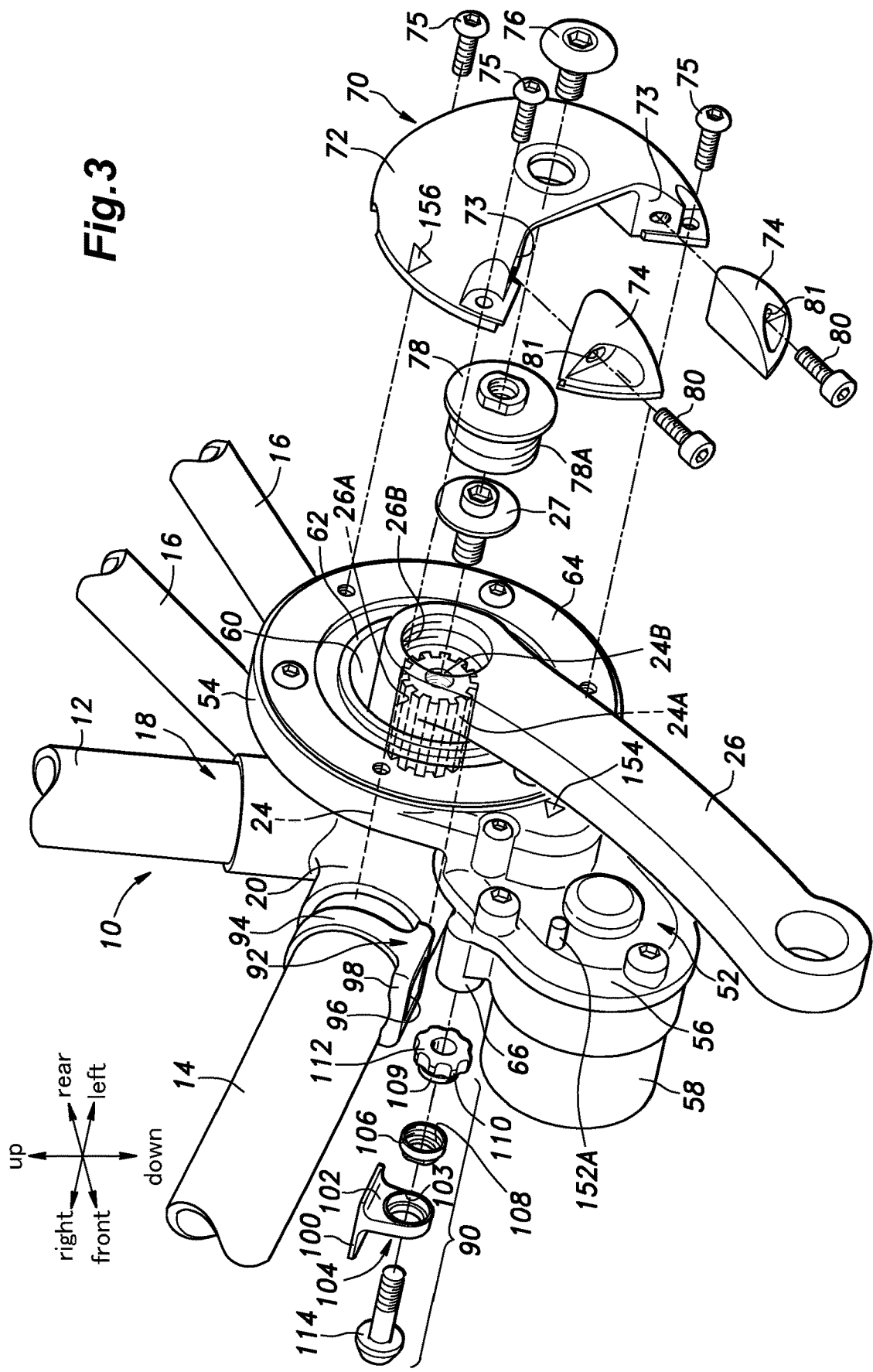
FIG. 3 is a fragmentary exploded perspective view of the electric power assist device and the bicycle of the first embodiment.

As shown in FIGS. 1 to 3, a bicycle 10 is provided with a frame structure 18 that includes a seat tube 12 extending substantially in the vertical direction and having a saddle (not shown in the drawings) attached to the upper end thereof, a down tube 14 extending substantially in the fore and aft direction, and left and right chain stays 16. The lower end of the seat tube 12, the rear end of the down tube 14, and the front ends of the chain stays 16 are connected to one another by a bearing tube 20 for supporting a crankshaft and also serving as a pipe joint.

The bearing tube 20 rotatably supports a crankshaft 24 extending substantially horizontally in the lateral direction. The left and right shaft ends of the crankshaft 24 project out of the bearing tube 20, and the base ends of the left and right crankarms 26 and 28 are fixed to the respective shaft ends of the crankshaft 24 with a rotational phase difference of 180 degrees. The crankshaft 24 forms the rotational center of the crankarms 26 and 28, and the rotational center axis of the crankshaft 24 and the rotational center axis of the crankarms 26 and 28 coincide with each other.

A spline shaft portion 24A is formed on the outer circumferential surface of the shaft end of the crankshaft 24. A spline hole 26A is formed at the base end of the crankarm 26. The spline shaft portion 24A and the spline hole 26A are engaged with each other so that the crankshaft 24 and the crankarm 26 are connected to each other in a torque transmitting relationship.

The outer end of the crankshaft 24 is formed with a screw hole 24B opened at the end surface thereof. The base end of the crankarm 26 is formed with a screw hole 26B coaxially communicating with the spline hole 26A and having an inner diameter larger than that of the spline hole 26A. The screw hole 24B threadably engages a crankarm mounting screw 27 provided with a flange portion that abuts against the annular shoulder surface defined between the spline hole 26A and the screw hole 24B. As a result, the crankarm 26 is prevented from being dislodged from the crankshaft 24.

The connection between the crankshaft 24 and the crankarm 28 on the other side is made in the same manner as the above discussed connection between the crankshaft 24 and the crankarm 26.

A pedal 30 is attached to the free end of each crankarm 26, 28. A drive sprocket 32 (chain wheel) is positioned between the crankarm 28 on the right side and the bearing tube 20. The drive sprocket 32 is coaxially connected (fixed) to the crankshaft 24.

The crankshaft 24 can be rotationally driven by the left and right crankarms 26 and 28. The rotation of the crankshaft 24 is transmitted to the drive sprocket 32, and is transmitted from the drive sprocket 32 to the rear wheel (not shown in the drawings) by a chain transmission mechanism (not shown in the drawings). As a result, the electric power assisted bicycle 10 travels forward.

The electric power assisted bicycle 10 is provided with a unitized and retrofittable electric power assist device 50. In the following description, the various directions such as up/down, front/rear, and right/left are based on the state where the electric power assist device 50 is attached to the frame structure 18 of the electric power assisted bicycle 10 as shown in FIGS. 1 and 2.

The electric power assist device 50 is provided with a housing 52 having a hollow structure. The housing 52 includes a ring portion 54 and a tongue shaped extension portion 56 extending radially outward from the ring portion 54. An electric motor 58 for generating an assist force is attached to the right surface of the extension portion 56. One end of the electric motor 58 is fixed to the extension portion 56 so that the rotational axis of the rotor output shaft (not shown in the drawings) is directed in the lateral direction.

As shown in FIG. 3, the ring portion 54 includes a cylindrical portion 62 centrally defining a central opening 60 that is open in the lateral direction, The cylindrical portion 62 rotatably supports an annular rotational output member 64 on the outer periphery thereof. The cylindrical portion 62, together with the rotational output member 64, is disposed between the frame structure 18 and the crankarm 26 in a coaxial relationship with the crankshaft 24 while the crankshaft 24 extends laterally through the central opening 60 in a loosely received state. The rotational output member 64 is connected to the electric motor 58 in a torque transmitting relationship via a gear train (not shown in the drawings) provided in the housing 52, and is thereby rotationally driven by the electric motor 58 in a coaxial relationship with the crankshaft 24.

The cylindrical portion 62 and the rotational output member 64 are installed between the frame structure 18 and the crankarm 26 by the following procedure.

First, the left pedal 30 which is on the side not fitted with the drive sprocket 32 is removed by using a common tool such as a spanner. Next, with the electric power assist device 50 tilted sideways (the posture in which the electric motor 58 faces upward), the free end side of the left crankarm 26 is inserted into the central opening 60, and with the crankarm 26 passed into the central opening 60, the electric power assist device 50 is moved toward the base end side (rotational center side) of the crankarm 26 along the extending direction of the crankarm 26.

As a result, the crankarm 26 is passed through the cylindrical portion 62 and the rotational output member 64 until the cylindrical portion 62 and the rotational output member 64 are positioned near the base end of the crankarm 26. The inner diameter of the central opening 60 is dimensioned so that the crankarm 26 may be passed through the central opening 60. If the central opening 60 has a large enough inner diameter to allow the pedal 30 attached to the crankarm 26 to be pass through, the assembly work can be performed without requiring the pedal 30 to be removed.

Next, the electric power assist device 50 is oriented to the normal posture (the posture shown in FIG. 2) in which the electric motor 58 faces sideways, and the crankshaft 24 is loosely passed into the central opening 60 in the axial direction. As a result, the cylindrical portion 62 and the rotational output member 64 can be positioned between the frame structure 18 and the crankarm 26 with the crankshaft 24 extending laterally and loosely received in the central opening 60 simply by removing the pedal 30 or without even requiring the pedal 30 to be removed.

The rotational output member 64 is connected to the crankshaft 24 and the crankarm 26 by a connecting mechanism 70. The connecting mechanism 70 includes a connecting main member 72 and two clamp piece members 74 and 77.

The screw hole 26B of the crankarm 26 threadably receives a male screw portion 78A of a flanged screw member 78 constituting a mount part for the crankarm 26 of the connecting main member 72. The connecting main member 72 has a substantially circular disk shape, and is fixed to the rotational output member 64 at the peripheral edge thereof by a plurality of bolts 75 and to the screw member 78 at the central part thereof by a bolt 76. As a result, the rotational output member 64 is coaxially positioned relative to the crankshaft 24 via the connecting main member 72 and the crankarm 26.

The two clamp piece members 74, each having a wedge shape, are positioned on either side of the base end part of the crankarm 26 with respect to the rotational direction thereof, such that each clamp piece member 74 is in contact with an angled edge 73 of a corresponding connecting main member 72. A bolt 80 is provided for each clamp piece member 74, and as the bolts 80 are tightened to connect the clamp piece members 74 to the connecting main member 72, the clamp piece members 74 are caused to slide toward each other guided by the angled edges with interposing the crankarm 26 from both sides with respect to the rotational direction, so that the crankarm 26 and the connecting main member 72 are connected to each other in a torque transmitting relationship.

As a result, the rotational output member 64 is coaxially connected to the crankshaft 24 in a torque transmitting relationship, via the connecting main member 72 and the crankarm 26, and thus the rotational output member 64 and the connecting main member 72 can rotate together with the crankshaft 24. The rotational output member 64 and the connecting main member 72 are collectively referred to as a rotating member.

The clamp piece members 74 define bolt through-holes 81, through which the bolts 80 are passed. The bolt through-holes 81 are each formed in an oval shape so that, as the bolts 80 are tightened to connect the clamp piece members 74 to the connecting main member 72, the clamp piece members 74 can slide toward each other.

The extension portion 56 of the housing 52 is positioned under the down tube 14 while supporting the electric motor 58. The extension portion 56 is supported by and suspended from the down tube 14 via a support mechanism 90.

The support mechanism 90 includes a mount member 92. The mount member 92 includes a support base member 98 fixed to the down tube 14 by a fastening band 94 and provided with a rectangular frame structure part 96 in a lower part thereof, and a support member 104, the support member 104 having a rectangular plate-shaped part 100 fitted into the rectangular frame structure part 96 and fixed to the support base member 98, and a depending piece 102 depending downward from the rectangular plate-shaped part 100 and extending in the fore and aft direction.

The depending piece 102 is a cantilever piece, and defines a through-hole 103 which extends in the axial direction of the crankshaft 24 (or in the lateral direction) and is provided with an annular shoulder. A cylindrical fixed bush 106 is fitted in (or fixed to) the through-hole 103 of the depending piece 102 in a rotationally fast manner.

A female screw 108 is formed on the inner circumferential surface of the fixed bush 106. A male screw 109 formed on the outer circumferential surface of a movable bush 110 is threaded with the female screw 108 so that the movable bush 110 can be threaded into and out of the large diameter portion 106B in the axial direction of the crankshaft 24 (i.e., in the lateral direction).

The movable bush 110 is provided with a flange part 112 on the side remote from the fixed bush 106. The outer circumference of the flange part 112 is provided with an uneven shape similar to flower petals so that the movable bush 110 can be turned by hand. The flange surface 112A of the flange part 112 is in direct contact with the laterally inwardly facing end surface 66A of a boss part (connecting part) 66 formed on an upper part of the extension portion 56 of the housing 52.

The mount member 92 fixedly supports the housing 52 with a fastening bolt 114 which is centrally passed through the fixed bush 106 and the movable bush 110 in the axial direction of the crankshaft 24, and threaded into a screw hole 68 (not shown) of the boss part 66.

In this way, the fixed bush 106 and the movable bush 110 are provided with a screw mechanism formed by the female screw 108 and the male screw 109 extending in the axial direction of the crankshaft 24 between the housing 52 and the frame structure 18, the screw mechanism forms an adjustment mechanism capable of adjusting (increasing or decreasing) the distance between the mount member 92 and the housing 52 along the axial direction of the crankshaft 24.

By suitably adjusting the distance along the axial direction, the tilting of the rotational output member 64 with respect to the central axis (crankshaft line) of the crankshaft 24 can be corrected, and the posture of the rotational output member 64 can be adjusted so that the rotational output member 64 extends along a plane orthogonal to the crankshaft axial line.

Triangular marks 154 and 156 that are externally visible are printed on the outer surfaces of the extension portion 56 and the connecting main member 72 of the housing 52, respectively, and alignment of the marks indicates that the connecting main member 72, (i.e., the rotational output member 64 integrated with the connecting main member 72) is rotated to a predetermined rotational position with respect to the housing 52. As shown in FIG. 1, the marks 154 and 156 are aligned when the angle $\beta$ formed by the straight line (unit center line) C and the straight line (crankarm line) E is 90 degrees, where the unit center line C passes through the rotation center point A of the crankshaft 24 (that of the rotational output member 64) and the rotation center point B of the electric motor 58, and the crankarm line E passes through the rotation center point A of the crankshaft 24 and the rotation center point D of the pedal 30.

The mounting angle of the housing 52 with respect to the frame structure 18 determines the angle $\gamma$ formed by the vertical line V along the direction of gravity and the unit center line C, which is detected based on an output signal of the gyro sensor 128 described later. When the marks 154 and 156 are aligned; that is, when the crankarm 26 is rotated to the rotational angle $\beta$, the angle $\alpha$ formed by the vertical line V and the crankarm line E is $\beta-\gamma$ (i.e, $\alpha=90-\gamma$), and the rotational angle sensor 124 is calibrated based on the angle $\alpha$ as described later.

The extension portion 56 of the housing 52 is provided with a push-button check switch 152 which can be operated by a user of the bicycle 10 (see FIG. 2). When the push button 152A of the check switch 152 is pressed and the check switch 152 is toggled, the control unit 120 performs calibration of the rotational angle sensor 124 as will be described later.

The extension portion 56 of the housing 52 contains the control unit 120 for electric power assist therein. A battery 122 consisting of a secondary battery that serves as a power source for the electric motor 58 and the control unit 120 is attached to the seat tube 12 by a fastening band (not shown) or any other fastening means.

Next, the control system of the electric power assist device 50 will be described with reference to FIG. 4.

A rotational angle sensor 124, a pulse sensor 126, a gyro sensor 128, a current sensor 130, and a voltage sensor 132 are attached to the electric power assist device 50.

The rotational angle sensor 124 is provided on the electric motor 58 or the housing 52, and configured to detect the motor rotational angle or the rotational angle (absolute angle) of the rotational output member 64. When the housing 52 of the electric power assist device 50 is attached to the frame structure 18 of the bicycle 10 and the rotational output member 64 is connected to the crankshaft 24 by the connecting mechanism 70, the rotational angle sensor 124 detects the crank rotational angle (absolute angle) of the crankshaft 24. As shown in FIG. 5, the zero point (origin) of the absolute angle that is detected by the rotational angle sensor 124 is set to the crank rotational angle of the crankshaft 24 when the pedal 30 of the crankarm 26 is located at the highest position.

In the following description, based on the premise that the electric power assist device 50 is attached to the frame structure 18 for the sake of simplicity, the rotational angle sensor 124 is sometimes described as being configured to detect the crank rotational angle of the crankshaft 24, which is equivalent to the motor rotational angle or the rotational angle of the rotational output member 64.

The pulse sensor 126 is provided in the housing 52 and detects the rotation of the rotational output member 64.

The gyro sensor 128 is provided in the housing 52 and detects the angular velocity of the rotational output member 64 (crankshaft 24). The gyro sensor 128 forms part of the tilt angle detector. Specifically, based on the output signal of the gyro sensor 128, the tilt angle detector detects the tilt angle of the electric power assist device 50 in the left-right direction and the fore and aft direction with respect to the direction of gravity; that is, the vertical line V.

The current sensor 130 detects the motor current value i of the electric motor 58.

The motor current value i changes in a 360-degree cycle according to the rotational angle of the rotational output member 64, which corresponds to the crank rotational angle, and the motor current value i also has a correlation with the rotational angular velocity of the crankshaft 24; that is, the pedaling force.

The voltage sensor 132 detects the voltage of the battery 122.

The control unit 120 is an electronically controlled device including a microcomputer and other components. The control unit includes a pedaling force estimator 140, a crank rotational direction determiner 142, a pedaling force presence determiner 144, a motor drive controller 146, and a calibrator 148.

The pedaling force estimator 140 receives information on the crank rotational angle from the rotational angle sensor 124, information on the rotational movement of the crankshaft 24 from the pulse sensor 126, information on the motor current value i from the current sensor 130, and estimates the pedaling force of the bicycle 10 from the difference or the ratio between the motor current value i1 at a preset first crank rotational angle and the motor current value i2 at a preset second crank rotational angle which is different from the first crank rotational angle.

The pedaling force estimator 140 estimates the pedaling force to be greater with an increasing difference (i1−i2) or ratio (i1/i2) between the motor current value i1 at the first crank rotational angle and the motor current value i2 at the second crank rotational angle.

The first crank rotational angle is within an angular range of 0 to 90 degrees inclusive from the position where the pedal 30 of the crankarm 26 is located above the crankshaft 24 on the vertical line V (see FIGS. 5 and 6) which passes through the rotation center point A of the crankshaft 24. The second crank rotational angle is within an angular range of 90 to 180 degrees inclusive from the position where the pedal 30 of the crankarm 26 is located above the crankshaft 24 on the vertical line V (see FIGS. 5 and 6) which passes through the rotation center point A of the crankshaft 24. Preferably, a rotational phase difference between the first crank rotation angle and the second crank rotation angle is 90 degrees.

When the calibration of the rotational angle sensor 124 by setting the reference absolute angle is performed on a flat ground (ground with no gradient), and the reference absolute angle (zero point angular position) detected by the rotational angle sensor 124 is set as an angle where the pedal 30 of the crankarm 26 is located above the crankshaft 24 on the vertical line F extending perpendicular to the road surface and passing through the rotation center point A of the crankshaft 24, the vertical line F overlaps the vertical line V as shown in FIG. 5. Thus, when the calibration of the rotational angle sensor 124 is performed on a flat ground (ground with no gradient), the first crank rotational angle may be within an angular range in which the absolute angle detected by the rotational angle sensor 124 is within 0 to 90 degrees inclusive and the second crank rotational angle may be within an angular range in which the absolute angle detected by the rotational angle sensor 124 is within 90 to 180 degrees inclusive. A reference symbol X denotes the position of the pedal 30 when the absolute angle detected by the rotational angle sensor 124 is 0 degree.

Each of the motor current values i1 and i2 may be a motor current value i at at least one point within a corresponding above-mentioned angular range. Alternatively, the motor current value i1 may be an average value or an integrated value of the motor current value i in a first angular range $\theta 1$ in which the absolute angle detected by the rotational angle sensor 124 is about 0 to 15 degrees, and the motor current value i2 may be an average value or an integrated value of the motor current value i in a second angular range $\theta 2$ in which the absolute angle detected by the rotational angle sensor 124 is about 90 to 15 degrees.

Figure 6A:
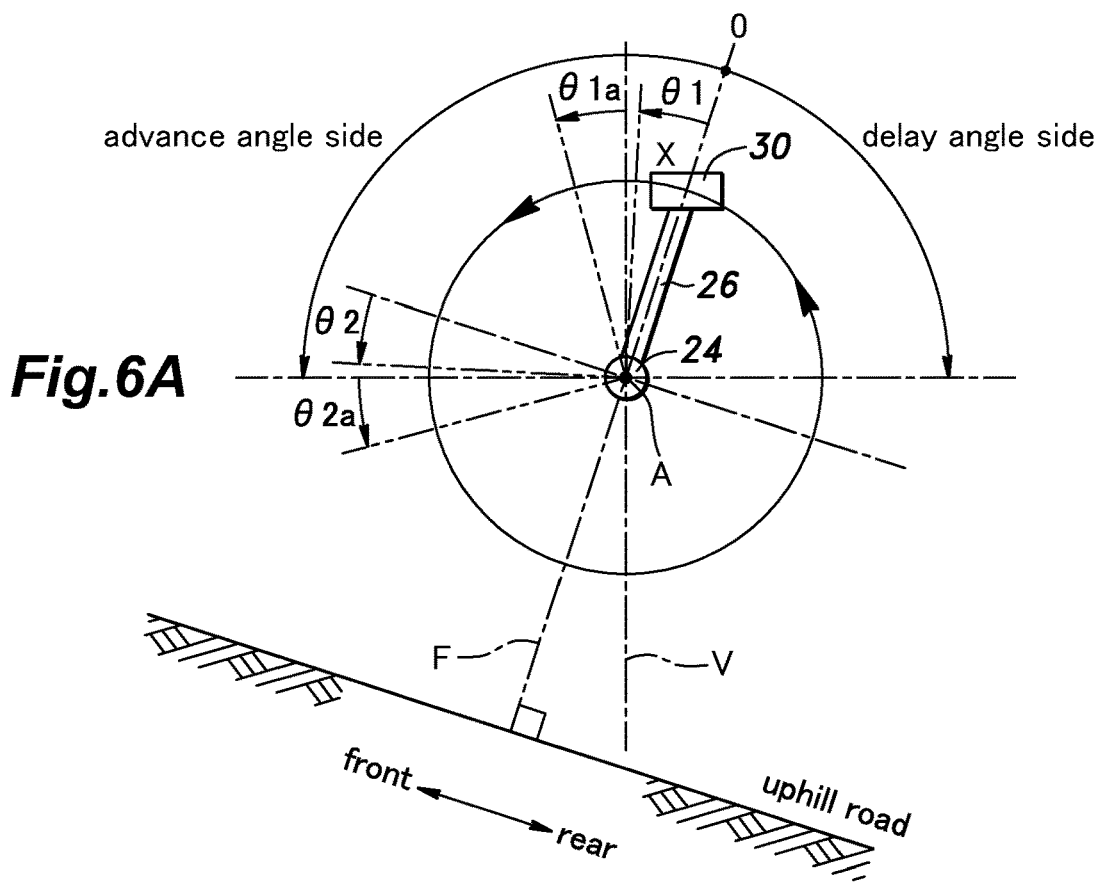
FIG. 6A is an explanatory diagram showing a crank rotational angle when the bicycle is traveling on an uphill road.

When the bicycle is on an uphill road where the road surface slopes upward at a certain angle, the vertical line F tilts with respect to the vertical line V according to the slope angle of the uphill road, as shown in FIG. 6(A), and thus the zero point position of the rotational angle sensor 124 deviates to the delay angle side in the crank rotational direction with respect to the vertical line V. In this situation, the first and second angular ranges $\theta 1$ and $\theta 2$, which are to be set with reference to the vertical line V, need to be corrected to $\theta 1a$ and $\theta 2a$ on the advance angle side, respectively.

Figure 6B:
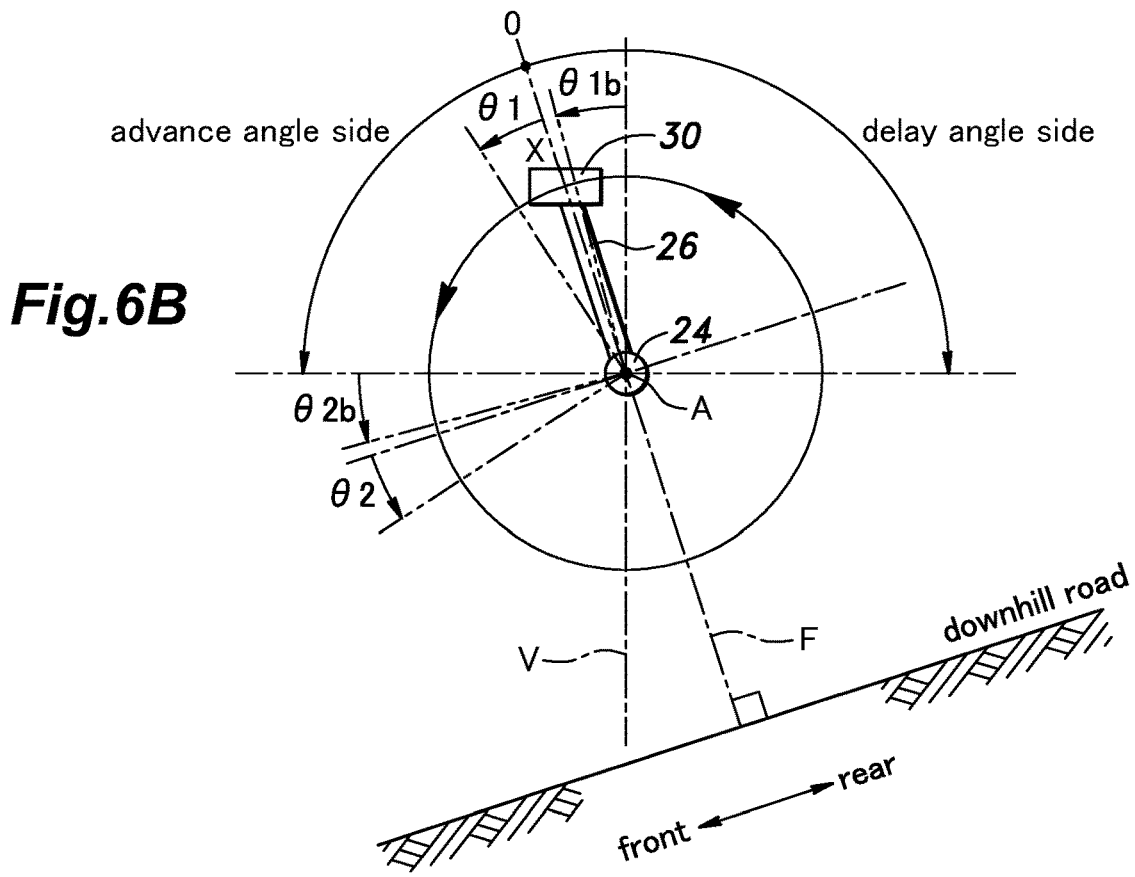
FIG. 6B is an explanatory diagram showing a crank rotational angle when the bicycle is traveling on a downhill road.

When the bicycle is on a downhill road where the road surface slopes downward at a certain angle, the vertical line F tilts with respect to the vertical line V according to the slope angle of the downhill road, as shown in FIG. 6(B), and thus the zero point position of the rotational angle sensor 124 deviates to the advance angle side in the crank rotational direction with respect to the vertical line V. In this situation, the first and second angular ranges θ1 and θ2, which are to be set with reference to the vertical line V, need to be corrected to θ1b and θ2b on the delay angle side, respectively.

Accordingly, on the uphill road, the pedaling force estimator 140 corrects the first and second crank rotational angles to the advance angle side in the crank rotational direction by an amount corresponding to the slope angle of the road surface, and on a downhill road, the pedaling force estimator 140 corrects the first and second crank rotational angles and the second crank to the delay angle side in the crank rotational direction by an amount corresponding to the slope angle of the road surface.

As a result, even when the bicycle is traveling on an uphill road or a downhill road, the pedaling force estimator 140 can properly estimate the pedaling force put on the bicycle 10 as in the case of on a flat road (road with no gradient).

As can be seen from the motor current waveform shown in FIG. 7, the average value or integrated value of the motor current value i1 in the first angular range θ1 is greater than the average value or integrated value of the motor current value i2 in the second angular range θ2, and the difference (i1−i2) or the ratio (i1/i2) is roughly proportional to the pedaling force, which correlates with the crank angular velocity.

The motor drive controller 146 outputs a control command to a motor drive circuit 150 so as to operate the electric motor 58 with an electric power (current or voltage) according primarily to the pedaling force estimated by the pedaling force estimator 140.

The motor drive controller 146 also receives information on the crank rotational angle from the rotational angle sensor 124, and based on the received information, the motor drive controller 146 calculates the angular velocity ω1 of the crankshaft 24 at the first crank rotational angle or in the first angular range θ1, and the angular velocity ω2 of the crankshaft 24 at the second crank rotational angle or in the second angular range θ2, and then outputs a drive torque control command determined based on the difference between the angular velocities θ1 and ω2, to the motor drive circuit 150.

The motor drive circuit 150 quantitatively sets the electric power to be supplied from the battery 122 to the electric motor 58. As a result, the electric motor 58 assists the pedaling with the drive torque determined according to the estimated value of the pedaling force. In this way, the electric motor can assist the pedaling according to the pedaling force without the need for any complicated feature for detecting pedaling force and any modification made to the bicycle 10.

The crank rotational direction determiner 142 determines whether the crankshaft 24 is rotating in a forward direction or in a reverse direction based on the crank rotational angles detected by the rotational angle sensor 124. When the crank rotational direction determiner 142 determines that the crankshaft 24 rotates in the reverse direction, the motor drive controller 146 performs control to cause the electric motor 58 to stop operating. This prevents unnecessary power assist from being applied when the crankshaft 24 rotates in the reverse direction.

The pedaling force presence determiner 144 determines whether or not a pedaling force is put on the pedal 30 from the rotational movement of the crankshaft 24 detected by the rotational angle sensor 124. When the pedaling force presence determiner 144 determines there is no pedaling force on the pedal, the motor drive controller 146 performs control to cause the electric motor 58 to stop operating. This prevents unnecessary power assist from being applied when there is no pedaling force on the pedal.

The motor drive controller 146 further performs control to increase or decrease the drive torque of the electric motor 58 according to the tilt angle with respect to the direction of gravity detected based on the output signal from the gyro sensor 128; that is, according to the tilts of the bicycle 10 in the left-right direction and the fore and aft direction with respect to the direction of gravity. This feature enables the power assist to be performed as needed by the rider, and improves the safety. For example, when the bicycle 10 is tilted to the left or right during turning, the motor drive controller decreases the assist force, and when the bicycle 10 is tilted in the fore and aft direction on an uphill road, the motor drive controller increases the assist force.

The motor drive controller 146 further performs control to reduce the rotational output of the electric motor 58 in response to the decrease in the battery voltage detected by the voltage sensor 132. This feature prevents over-discharging of the battery 122, thereby extending the life of the battery 122. This feature can also reduce the power consumption of the battery 122, thereby extending the power assist available distance (duration time) on one charge of the battery 122.

The calibrator 148 calibrates the rotational angle sensor 124, setting the reference absolute angle measured by the rotational angle sensor 124 on a flat ground based on the direction of gravity detected based on the output signal from the gyro sensor 128.

When the rotational angle sensor 124 is calibrated by setting the reference absolute angle of the rotational angle sensor 124 (detecting the origin angular position) based on the angle α calculated by α=90−γ, where γ is determined by the mounting angle of the housing 52 with respect to the frame structure 18 when the marks 154 and 156 are aligned; that is, when the rotational angle β of the crankarm 26 is 90 degrees.

A user can align the mark 154 with the mark 156 by turning the crankarm 26 in the reverse direction, or turning the crankarm 26 with the rear wheel (not shown) of the bicycle 10 away from the road surface. When the marks 154 and 156 are aligned and the user presses the push button 152A of the check switch 152, the calibrator 148 recognizes that the marks 154 and 156 are aligned and thus the angle β is 90 degrees, and then performs the calibration of the rotational angle sensor 124.

By performing the calibration, the first and second crank rotational angles determined from the motor current values i1 and i2 detected (measured) by the current sensor 130 are prevented from varying according to the mounting angle (i.e., the angle γ) of the electric power assist device 50 with respect to the frame structure 18.

As a result, even when the mounting angle of the electric power assist device 50 with respect to the bicycle 10 varies, the electric power assist device can perform proper power assist control through the proper detection of the crank rotational angles (absolute angles).

Figure 8:
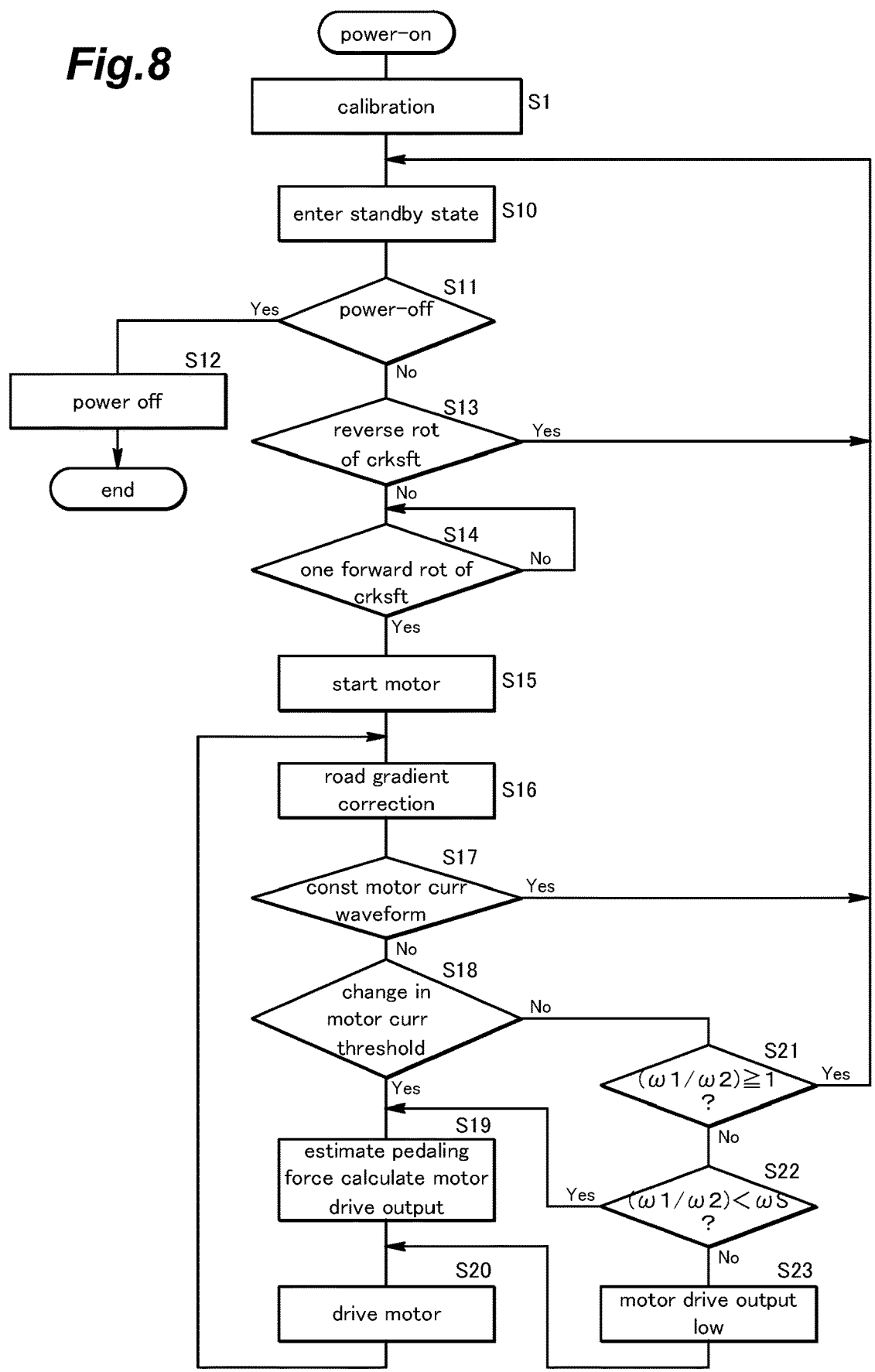
FIG. 8 is a flowchart of power assist control of the electric power assist device of the first embodiment.

Next, a power assist control routine executed by the control unit 120 will be described with reference to the flowchart shown in FIG. 8.

This control routine is started when the electric power assist device 50 is turned on. First, the calibration of the rotational angle sensor 124 is performed (step S1). In the present embodiment, the calibration of the rotational angle sensor 124 is performed every time the electric power assist device 50 is turned on. However, the calibration may be performed when the electric power assist device 50 is attached to the bicycle 10 or when a calibration request is made by an external signal.

When the calibration is completed, the control unit 120 performs a standby state entry process, causing the electric power assist device 50 to enter a standby state (step S10). In the standby state entry process, the control unit 120 activates the rotational angle sensor 124, the pulse sensor 126, the gyro sensor 128, the current sensor 130, and the voltage sensor 132 by feeding power, and causes the electric motor 58 to stop operating.

Next, the control unit 120 determines whether or not the power supplied to the electric power assist device 50 is turned off (step S11). When the power is turned off, the control unit 120 performs a power-off process (step S12). The power-off process involves stopping the power supplied to each of the sensors 124, 126, 128, 130 and 132.

When the power is not turned off, the control unit 120 determines whether or not the crankshaft 24 rotates in the reverse direction (step S13). When the crankshaft 24 is rotating in the reverse direction, the process returns to the standby state entry process (step S10).

When the crankshaft 24 is not rotating in the reverse direction, the control unit 120 confirms that the crankshaft 24 has made one rotation (step S14), and then starts the electric motor 58 (step S15).

Next, the control unit 120 performs a road gradient correction according to the slope angle of the road surface (step S16). As shown in FIGS. 5 and 6, the control unit 120 performs the road gradient correction based on the slope angle of the road surface determined based on the output signal from the gyro sensor 128, by shifting the first and second angular ranges $\theta 1$ and $\theta 2$ to the advance angle side (uphill road) or the delay angle side (downhill road) of the crank rotational angle so as to correspond to the respective angular ranges in the case of on a flat road. As a result, even when the bicycle is traveling on the uphill road or the downhill road, the first angle range $\theta 1$ and the second angle range $\theta 2$ are properly set in response to the change in pedaling force as in the case of traveling on a flat road.

Next, the control unit 120 determines whether or not the waveform of the motor current value i is constant during one rotational movement of the crankshaft 24 (step S17). When the waveform of the motor current value i is constant during one rotation, the control unit 120 estimates that the pedaling force is substantially zero and determines that the bicycle is coasting without requiring power assist, and the process returns to the standby state entry process (step S10).

When the waveform of the motor current value i is not constant during one rotation, the control unit 120 determines whether or not the change (difference) in the motor current value i is equal to or greater than a predetermined threshold value (step S18). Specifically, the control unit 120 calculates the change (difference value) between the average value or the integrated value of the motor current value i in the first angular range $\theta 1$ and that in the second angular range $\theta 2$, and determines whether or not the change (difference value) is equal to or greater than the predetermined threshold value.

When the change in the motor current value i is equal to or greater than the predetermined threshold value, as the pedaling force is roughly proportional to the difference value between the average value or integral value of the motor current value i in the first angular range $\theta 1$ and that in the second angular range $\theta 2$, the control unit 120 estimates the pedaling force based on the difference value, and calculates the motor drive output according to the estimated pedaling force (step S19).

Next, the control unit 120 performs a motor drive process based on the calculated motor drive output (step S20). The motor drive process involves energizing the electric motor 58 with electric power (voltage or current) corresponding to the calculated motor drive output (drive torque). As a result, the electric motor can assist the pedaling according to the pedaling force.

When the change in the motor current value i is less than the predetermined threshold value, the control unit 120 calculates the angular velocity $\omega 1$ of the crankshaft 24 in the first angle range $\theta 1$ and the angular velocity $\omega 2$ of the crankshaft 24 in the second angle range $\theta 2$, and determines whether or not $(\omega 1/\omega 2)$ is equal to or greater than one (step S21). When $(\omega 1/\omega 2)$ is equal to or greater than one, the process returns to the standby state entry process (step S10). When $(\omega 1/\omega 2)$ is less than one, the control unit 120 then determines whether $(\omega 1/\omega 2)$ is less than a predetermined threshold value $\omega S$ (step S22).

When $(\omega 1/\omega 2)$ is equal to or less than the predetermined threshold value $\omega S$, as the pedaling force is estimated to increase with a decreasing value of $(\omega 1/\omega 2)$, the control unit 120 calculates the motor drive output according to $(\omega 1/\omega 2)$ (step S19), and performs the motor drive process based on the calculated motor drive output (step S20). As a result, the electric motor can assist the pedaling according to the pedaling force.

When $(\omega 1/\omega 2)$ is greater than the predetermined threshold value ($\omega$S, the control unit 120 sets the motor drive output to a predetermined low output ("weak" motor drive output) (step S23), and performs the motor drive process based on the "weak" motor drive output (step S20).

As a result, the electric motor can assist the pedaling according to the pedaling force, and can perform the power assist as needed by the rider.

Figure 9:
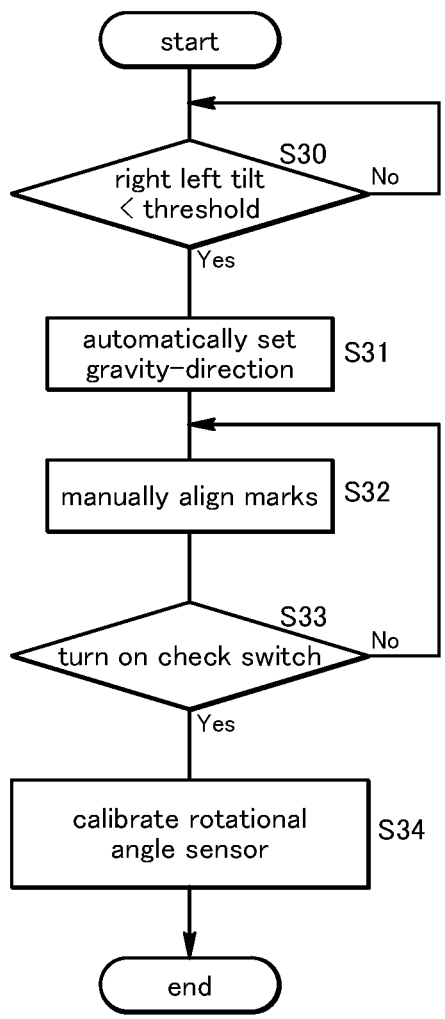
FIG. 9 is a flowchart of calibration of the rotational angle sensor for detecting crank rotational angles of the electric power assist device of the first embodiment.

Next, the calibration of the rotational angle sensor 124 will be described with reference to the flowchart shown in FIG. 9.

First, the control unit 120 determines whether or not the tilt of the bicycle 10 in the left-right direction with respect to the road surface is equal to or less than a predetermined threshold value (step S30). When the tilt in the left-right direction is greater than the predetermined threshold value, the control unit 120 does not perform the calibration.

When the tilt in the left-right direction is equal to or less than the predetermined threshold value, the control unit 120 automatically sets a direction of gravity detected based on the output signal from the gyro sensor 128 (step S31). Thereby, the control unit 120 sets the mounting angle $\gamma$.

Next, a user manually rotates the connecting main member 72 (rotational output member 64) so as to align the mark 156 with the mark 154 (step S32).

Then, the control unit 120 determines whether or not a user presses the push button 152A so that the check switch 152 is turned on in order to confirm that the alignment is completed (step S33).

When the check switch 152 is in the ON state, the control unit 120 calibrates the rotational angle sensor 124 (step S34).

As a result, the rotational angle sensor is calibrated to eliminate errors in the detected crank rotational angle (absolute angle) caused due to variation of the angle at which the electric power assist device is attached to the bicycle 10.

In the above embodiment, the calibrator 148 can perform the calibration when the connecting main member 72 is confirmed to be at the rotational position where the marks 154 and 156 are aligned. However, in other embodiments, the calibrator 148 may perform the calibration when the connecting main member 72 is maintained at the rotational position where the marks 154 and 156 are aligned for a predetermined period of time (e.g., about one second). In this case, the check switch 152 can be omitted.

Figure 10:
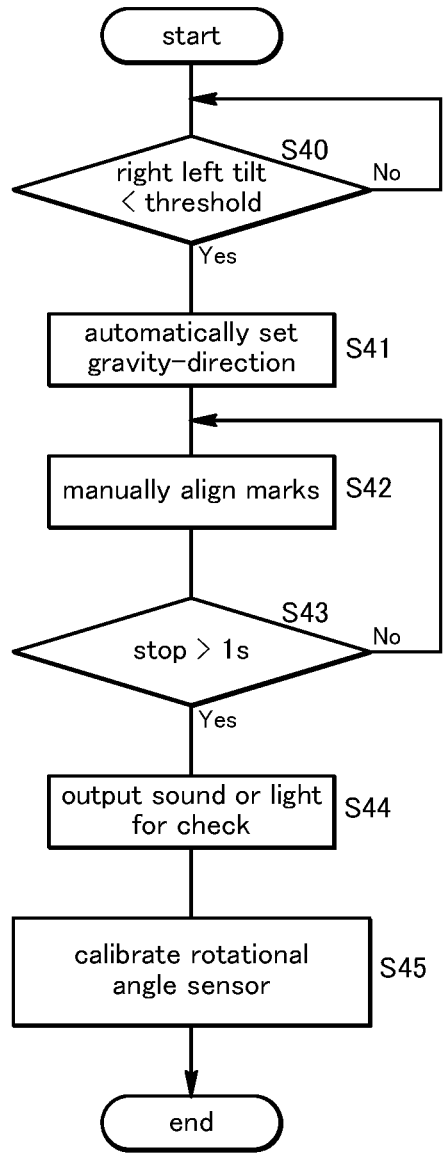
FIG. 10 is a flowchart of calibration of the rotational angle sensor for detecting crank rotational angles of the electric power assist device of a variation of the first embodiment.

The calibration of the rotational angle sensor 124 according to this embodiment, in which the check switch 152 is not used, will be described with reference to the flowchart shown in FIG. 10.

First, the control unit 120 determines whether or not the tilt of the bicycle 10 in the left-right direction with respect to the road surface is equal to or less than a predetermined threshold value (step S40). When the tilt in the left-right direction is greater than the predetermined threshold value, the control unit 120 does not perform the calibration.

When the tilt in the left-right direction is equal to or less than the predetermined threshold value, the control unit 120 automatically sets a direction of gravity detected based on the output signal from the gyro sensor 128 (step S41). Thereby, the control unit 120 sets the mounting angle γ.

Next, a user manually rotates the connecting main member 72 (rotational output member 64) so as to align the mark 156 with the mark 154 (step S42).

When the state in which the alignment is completed is maintained for a predetermined period of time (step S43), the control unit 120 causes the electric power assist device to produce a confirmation sound or causes a confirmation lamp to emit light, thereby notifying the user of the start of the calibration (step S44). Then, the control unit 120 calibrates the rotational angle sensor 124 (step S45).

Figure 11:
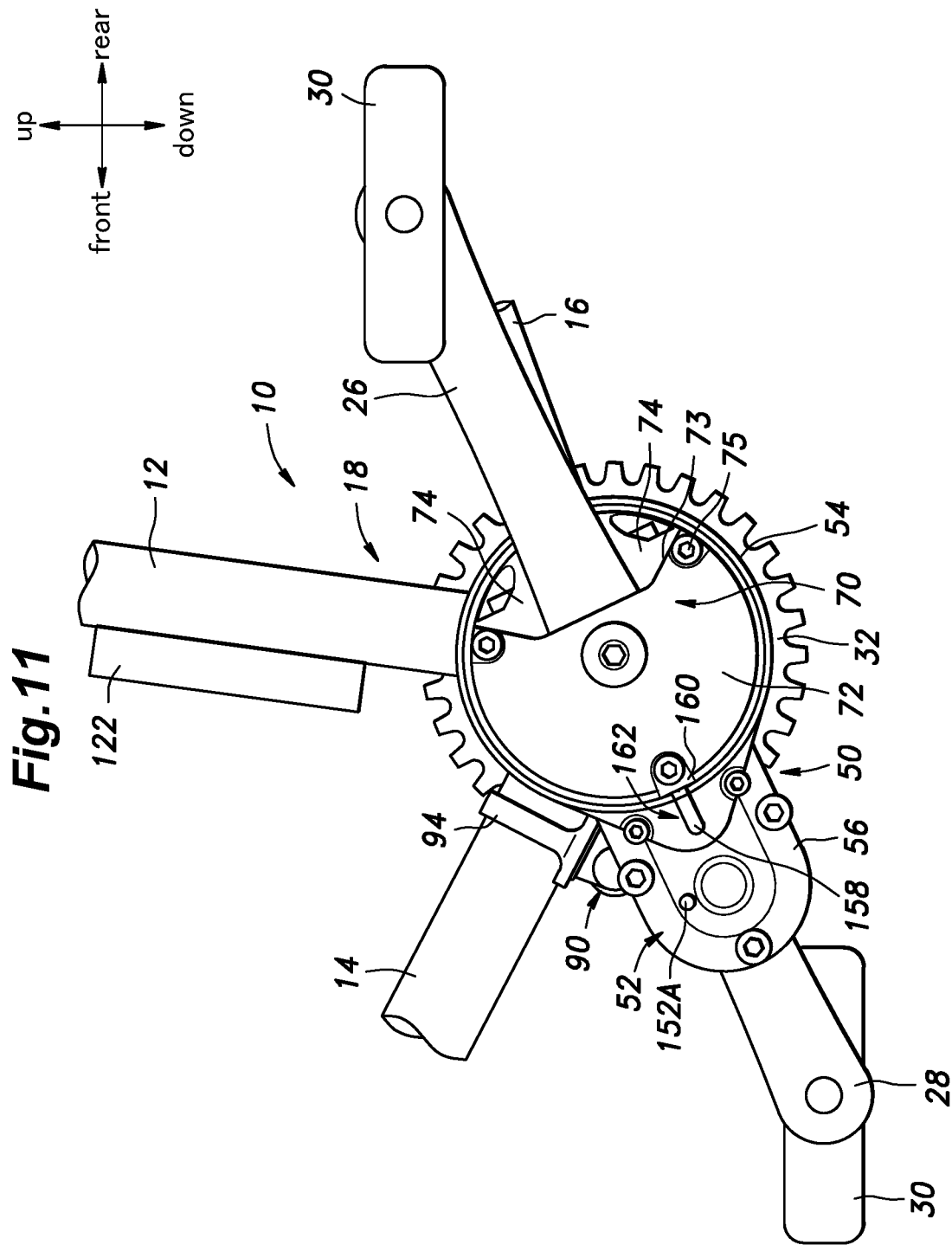
FIG. 11 is a side view of an electric power assist device according to a second embodiment of the present invention and a bicycle fitted with the electric power assist device.

Next, an electric power assist device 50 according to a second embodiment of the present invention will be described with reference to FIG. 11. In FIG. 11, the parts corresponding to those in FIGS. 1 to 3 are denoted with like reference numerals without necessarily repeating the description of such parts.

In the second embodiment, the electric power assist device 50 includes a position (rotational position) sensor (pulse sensor) 162, which is comprised primarily of a magnetic sensor 158 attached to the extension portion 56 of the housing 52 and a magnet piece 160 attached to the connecting main member 72 at a predetermined circumferential position thereof. The position sensor 162 can detect that the connecting main member 72 is positioned at a predetermined rotational position as the magnetic sensor 158 senses the magnet piece 160 when the connecting main member 72 is at that position. In other words, the position sensor 162 in the second embodiment replaces the marks 154 and 156 in the first embodiment with electrical signals. The position sensor 162 outputs a pulse signal when the connecting main member 72 is positioned at the predetermined rotational position, and may be the part of the pulse sensor 126 in the first embodiment.

When the position sensor 162 detects that the connecting main member 72 is located at the predetermined rotational position, the calibrator 148 automatically starts the calibration in order to set the reference absolute angle of the rotational angle sensor 124.

In the second embodiment, it is ensued that the electric power assist device 50 can calibrate the rotational angle sensor 124 when the connecting main member 72 at the predetermined rotational position.

Figure 12:
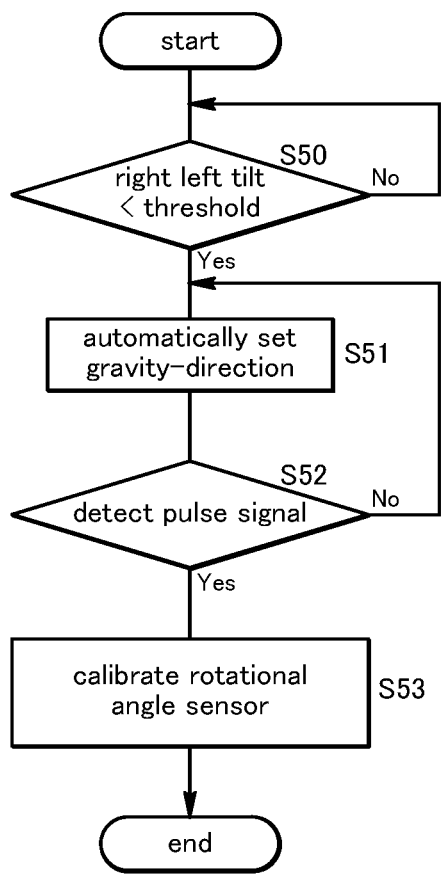
FIG. 12 is a flowchart of calibration of the rotational angle sensor for detecting crank rotational angles of the electric power assist device of the second embodiment.

The calibration of the rotational angle sensor 124 will be described with reference to the flowchart shown in FIG. 12.

First, the control unit 120 determines whether or not the tilt of the bicycle 10 in the left-right direction with respect to the road surface is equal to or less than a predetermined threshold value (step S50). When the tilt in the left-right direction is greater than the predetermined threshold value, the control unit 120 does not perform the calibration.

When the tilt in the left-right direction is equal to or less than the predetermined threshold value, the control unit 120 automatically sets a direction of gravity detected based on the output signal from the gyro sensor 128 (step S51). Thereby, the control unit 120 sets the mounting angle γ.

Next, while a user manually rotates the connecting main member 72 (rotational output member 64), the control unit 120 monitors for a pulse signal from the position sensor 162 (step S52). When detecting the pulse signal from the position sensor, the control unit 120 calibrates the rotational angle sensor 124 (step S53).

Figure 13:
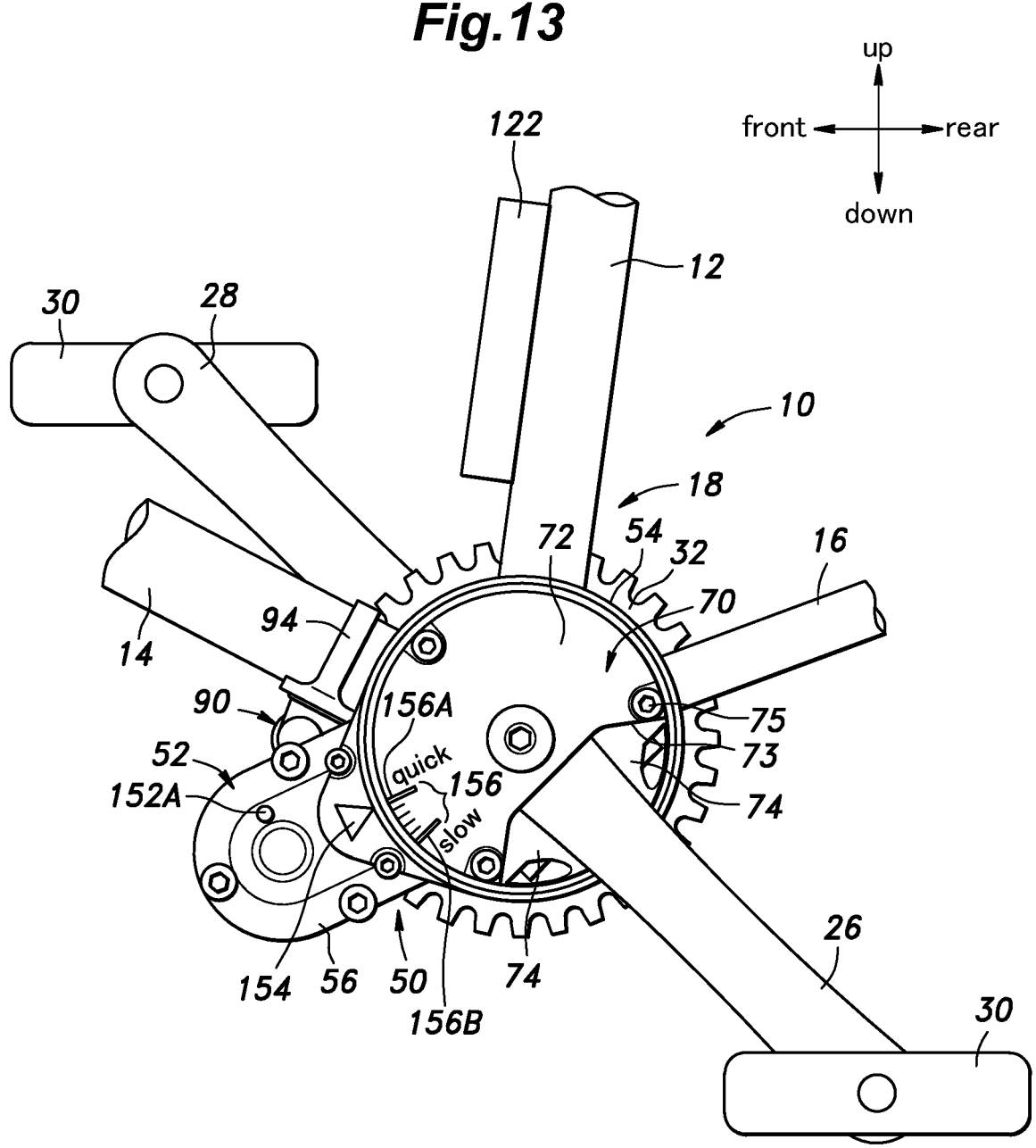
FIG. 13 is a side view of an electric power assist device according to a third embodiment of the present invention and a bicycle fitted with the electric power assist device.

Next, an electric power assist device 50 according to a third embodiment of the present invention will be described with reference to FIG. 13. In FIG. 13, the parts corresponding to those in FIGS. 1 to 3 are denoted with like reference numerals without necessarily repeating the description of such parts.

In the third embodiment, the electric power assist device 50 is provided with a mark (quick) 156A, a mark (slow) 156B, and marks 156 between the mark (quick) 156A and the mark (slow) 156B such that adjoining marks 156 are separated from each other at predetermined intervals in the rotational direction of the connecting main member 72, thereby forming a scale-like pattern. The marks 156 are provided for adjusting the rotational position of the connecting main member 72.

In the third embodiment, a user can rotate the connecting main member 72 so as to change a selected one of the scale-like marks 156 (between the mark (quick) 156A and the mark (slow) 156B) to be aligned with a mark 145 on the housing 52, thereby changing the crank rotational angle at which the calibration of the rotational angle sensor 124 is performed.

In this way, the absolute angle determined with respect to the crank rotational angle detected by the rotational angle sensor 124 can be changed, allowing a user to select the absolute angles of the first and second crank rotational angles as desired. As a result, the user can appropriately decide the response time of power assist control (the crank rotational angle at which power assist control starts for each rotation of the crankshaft) between a quick response time and a slow response time.

Figure 14:
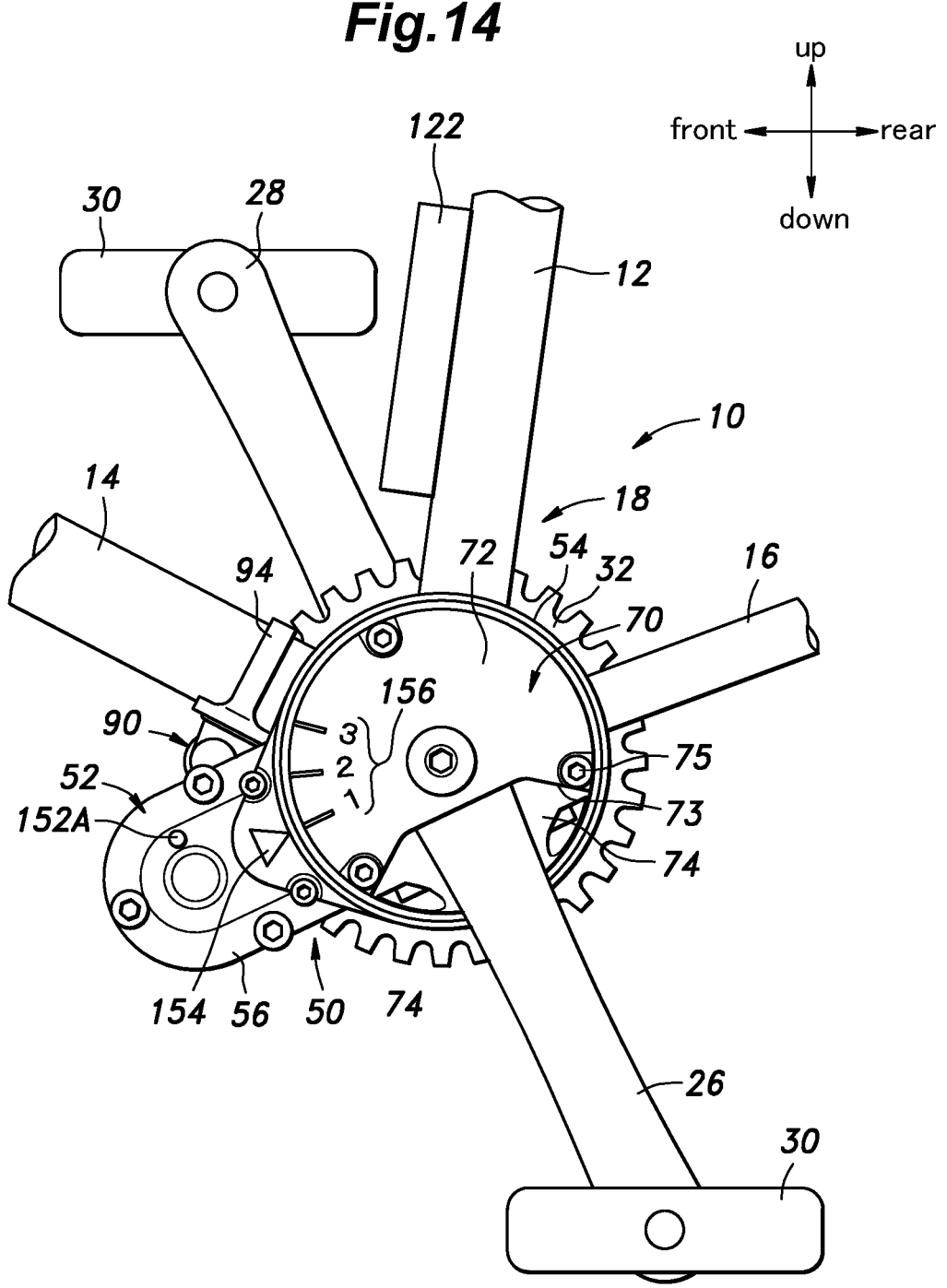
FIG. 14 is a side view of an electric power assist device according to a fourth embodiment of the present invention and a bicycle fitted with the electric power assist device.

Next, an electric power assist device 50 according to a fourth embodiment of the present invention will be described with reference to FIG. 14. In FIG. 14, the parts corresponding to those in FIGS. 1 to 3 are denoted with like reference numerals without necessarily repeating the description of such parts.

In the fourth embodiment, the electric power assist device 50 is provided with a plurality of marks 156 on the connecting main member 72 arranged along its rotational direction for adjusting the rotational position thereof. In the present embodiment, three marks 156 numbered 1, 2, and 3 are provided on the connecting main member 72.

The calibrator 148 performs the calibration of the rotational angle sensor 124 only when the calibrator recognizes, based on the output signal from the rotational angle sensor 124, that the connecting main member 72 is rotated and the respective marks 156 are sequentially aligned with the mark 154 on the housing 52 such that the numbers of the aligned marks are in a sequence of 1-3-1-2, for example.

When this sequence of numbers is kept secret by the user, the electric power assist device provided with these marks 156 serves as a dial-lock-type lock mechanism, providing an anti-theft feature.

Figure 15:
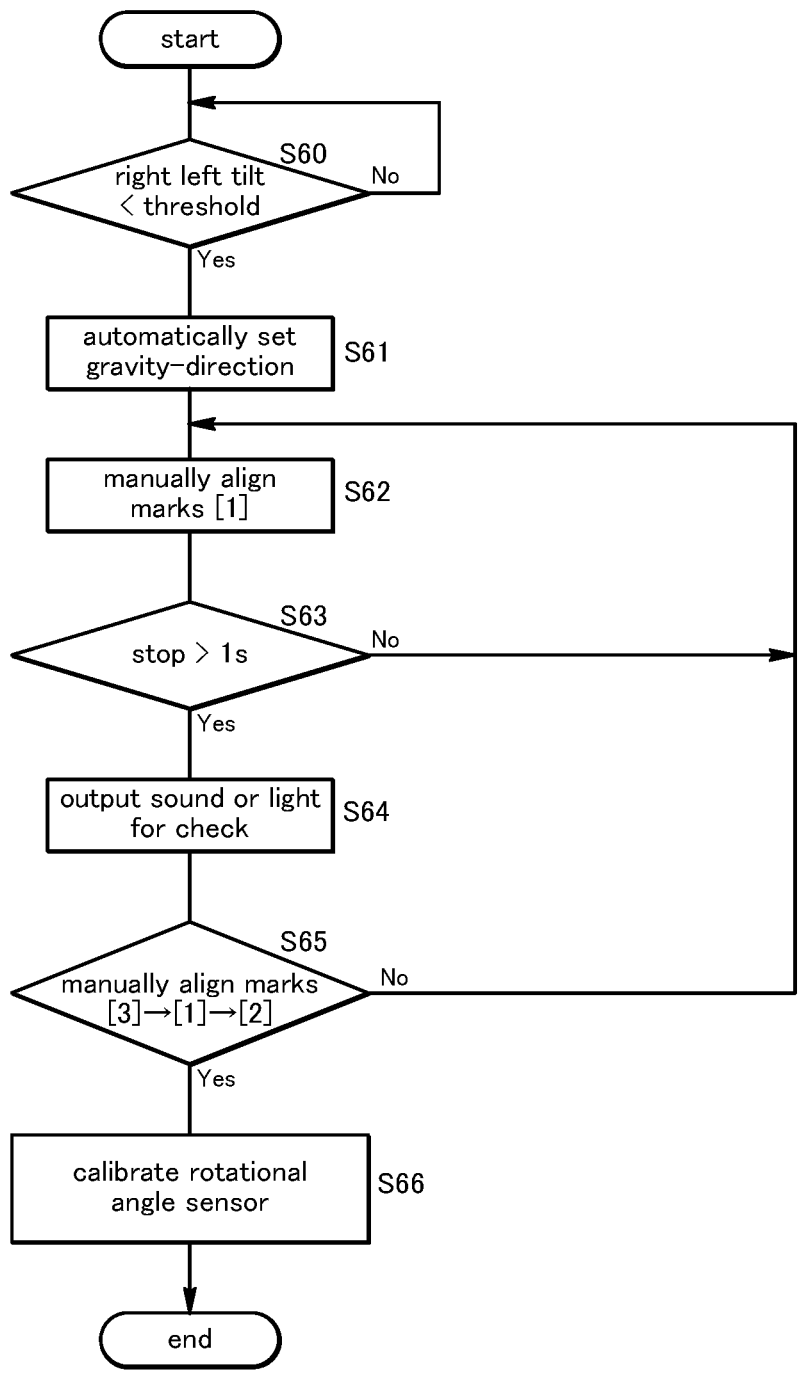
FIG. 15 is a flowchart of calibration of the rotational angle sensor for detecting crank rotational angles of the electric power assist device of the fourth embodiment.

The calibration of the rotational angle sensor 124 in the fourth embodiment will be described with reference to the flowchart shown in FIG. 15.

First, the control unit 120 determines whether or not the tilt of the bicycle 10 in the left-right direction with respect to the road surface is equal to or less than a predetermined threshold value (step S60). When the tilt in the left-right direction is greater than the predetermined threshold value, the control unit 120 does not perform the calibration.

When the tilt in the left-right direction is equal to or less than the predetermined threshold value, the control unit 120 automatically sets a direction of gravity detected based on the output signal from the gyro sensor 128 (step S61). Thereby, the control unit 120 sets the mounting angle γ.

Next, a user manually rotates the connecting main member 72 (rotational output member 64) so as to align the mark 156 numbered "1", with the mark 154 (step S62).

When the state in which the alignment is completed is maintained for a predetermined period of time (step S63), the control unit 120 causes the electric power assist device to produce a confirmation sound or causes a confirmation lamp to emit light, thereby notifying the user that the alignment state is maintained for the predetermined period of time (step S64).

Thereafter, when the user manually rotates the connecting main member 72 (rotational output member 64) to sequentially align the respective marks 156 with the mark 154 such that the numbers of the aligned marks are in a sequence of 3-1-2 (step S65), the control unit 120 performs the calibration of the rotational angle sensor 124 (step S66).

The present invention has been described in terms of specific embodiments, but is not limited by such embodiments, and can be modified in various ways without departing from the scope of the present invention.

For example, although, in the above-described embodiments, the rotational angular velocity of the crankshaft 24 is represented and detected as the motor current of the electric motor 58, the rotational angular velocity of the crankshaft 24 may be directly detected as the rotational angular velocity of the crankshaft 24. A sensor for implementing the tilt angle detector is not limited to a gyro sensor 128, and may be an electronic level or any other type of tilt sensor.

A basis for the estimation of pedaling force is not limited to the difference or the ratio between motor currents at different crank rotational angles, and may be the difference or the ratio between angular velocities or angular acceleration values at different crank rotational angles.

The housing 52 may be arranged between the seat tube 12 and the down tube 14, and indirectly supported by the frame structure 18 via the seat tube 12 or the down tube 14.

In addition, all of the components shown in the above-described embodiments are not necessarily essential for the present invention, but can be appropriately omitted and substituted as long as such omission and substitution do not deviate from the gist of the present invention.

Glossary 10 bicycle
12 Seat tube
14 down tube
16 chain stay
18 frame structure
20 bearing tube
24 crankshaft
26 crankarm
26A spline hole
27 crankarm mounting screw
28 crankarm
30 pedal
32 drive sprocket
50 electric power assist device
52 housing
54 ring portion
56 extension portion
58 electric motor
60 central opening
62 cylindrical portion
64 rotational output member
66 boss part
70 connecting mechanism
72 connecting main member
73 angled edge
74 clamp piece member
75 bolt
76 bolt
78 screw member
80 bolts
81 through-hole
90 support mechanism
92 mount member
94 fastening band
96 rectangular frame structure part
98 support base member
100 rectangular plate-shaped part
102 depending piece
103 through-hole
104 support member
106 fixed bush
106B large diameter portion
108 female screw
109 male screw
110 movable bush
112 flange part
114 fastening bolt
120 control unit
126 pulse sensor
128 gyro sensor
130 current sensor
132 voltage sensor
140 pedaling force estimator
142 crank rotational direction determiner
144 pedaling force presence determiner
146 motor drive controller
148 calibrator
150 motor drive circuit
152 check switch
152 push button
154 mark
156 mark
158 magnetic sensor
160 magnet piece
162 position sensor

The invention claimed is:

1. An electric power assist device for bicycles, the device comprising:
a housing which can be attached to a frame structure of a bicycle;
an electric motor provided in the housing;
a rotating member rotatably supported by the housing, rotationally driven by the electric motor, and connected to a crankshaft or crankarm of the bicycle in a torque transmitting relationship;

a rotational angle sensor provided in the housing and configured to detect a rotational angle of the electric motor or the rotating member; and a control unit for controlling operation of the electric motor based on the rotational angle detected by the rotational angle sensor, wherein the electric power assist device further comprises a tilt angle detector for detecting a tilt angle with respect to a direction of gravity, and wherein the control unit comprises a calibrator for determining an absolute angle of the rotational angle detected by the rotational angle sensor based on an output signal from the tilt angle detector, wherein the calibrator determines the absolute angle of the rotational angle sensor when the rotating member is rotated to or positioned at a predetermined rotational position with respect to the housing.

2. The electric power assist device according to claim 1, wherein the tilt angle detector includes a gyro sensor.

3. The electric power assist device according to claim 1, wherein the housing and the rotating member are provided with respective marks which are externally visible, wherein alignment of the marks indicates that the rotating member is rotated to the predetermined rotational position with respect to the housing, and wherein the calibrator determines the absolute angle of the rotational angle sensor when the marks are aligned.

4. The electric power assist device according to claim 3, wherein the calibrator determines the absolute angle of the rotational angle sensor when the rotating member is maintained at the predetermined rotational position for a predetermined period of time.

5. The electric power assist device according to claim 1, further comprising a check switch which can be toggled by a user's manual operation, and wherein the calibrator determines the absolute angle of the rotational angle sensor when the check switch is toggled.

6. The electric power assist device according to claim 1, further comprising a position sensor for detecting that the rotating member is positioned at the predetermined rotational position, wherein the calibrator determines the absolute angle of the rotational angle sensor when the position sensor detects that the rotating member is positioned at the predetermined rotational position.

7. The electric power assist device according to claim 3, wherein the predetermined rotational position of the rotating member is set as any rotational position within a predetermined rotational position range of the rotating member.

8. The electric power assist device according to claim 3, wherein the control unit allows power assist control to be started when the rotating member is sequentially positioned at a plurality of predetermined rotational positions in a predetermined sequence.

9. The electric power assist device according to claim 1, wherein the control unit determines a drive torque of the electric motor based on a difference or a ratio between motor currents, angular velocities, or angular acceleration values measured at a first crank rotational angle and a second crank rotational angle in each cycle of the rotation of the crankshaft.

10. The electric power assist device according to claim 9, wherein a rotational phase difference between the first crank rotational angle and the second crank rotational angle is 90 degrees.

11. The electric power assist device according to claim 9, wherein, when the bicycle is travelling on a uphill road which slopes upward at an upward-inclined angle, the control unit corrects the first and second crank rotational angles so as to advance the angles by an amount corresponding to the upward-inclined angle, and wherein, when the bicycle is travelling on a downhill road which slopes downward at a downward-inclined angle, the control unit corrects the first and second crank rotational angles so as to delay the angles by an amount corresponding to the downward-inclined angle.

12. The electric power assist device according to claim 1, wherein the control unit determines whether the crankshaft rotates in a forward direction or in a reverse direction based on crank rotational angles detected by the rotational angle sensor, and wherein, when determining that the crankshaft rotates in the reverse direction, the control unit causes the electric motor to stop operating.

13. The electric power assist device according to claim 1, wherein the control unit corrects a drive torque of the electric motor based on the tilt angle with respect to the direction of gravity detected by the tilt angle detector.

14. The electric power assist device according to claim 1, further comprising:

a battery which serves as a power source for the electric motor; and a voltage sensor for detecting a voltage of the battery, wherein the control unit reduces a rotational output of the electric motor in response to a voltage drop detected by the voltage sensor.

15. A bicycle fitted with the electric power assist device according to claim 1.

* * * * *